(12) United States Patent
Kim et al.

(10) Patent No.: US 8,628,876 B2
(45) Date of Patent: Jan. 14, 2014

(54) ELECTRODE ASSEMBLY AND LITHIUM SECONDARY BATTERY WITH SAME

(75) Inventors: Hyejung Kim, Yongin-si (KR); Jeongwon Oh, Yongin-si (KR); Hyunjin Choi, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 792 days.

(21) Appl. No.: 12/356,332

(22) Filed: Jan. 20, 2009

(65) Prior Publication Data

US 2009/0317713 A1 Dec. 24, 2009

Related U.S. Application Data

(60) Provisional application No. 61/074,566, filed on Jun. 20, 2008.

(51) Int. Cl.
*H01M 2/02* (2006.01)
*B32B 38/00* (2006.01)
*B32B 37/00* (2006.01)
*B05D 5/12* (2006.01)
*H01M 4/02* (2006.01)

(52) U.S. Cl.
USPC ........... 429/164; 429/163; 429/211; 156/278; 156/192; 156/267

(58) Field of Classification Search
USPC ........... 429/163–164, 211; 156/192, 267, 278
See application file for complete search history.

(56) References Cited

U.S. PATENT DOCUMENTS

| | | |
|---|---|---|
| 6,335,114 B1 | 1/2002 | Ueshima |
| 6,387,564 B1 | 5/2002 | Yamashita et al. |
| 2003/0099880 A1 | 5/2003 | Park et al. |
| 2003/0224242 A1 | 12/2003 | Kaito et al. |
| 2007/0154788 A1 | 7/2007 | Hong et al. |
| 2008/0280197 A1 | 11/2008 | Machida |

FOREIGN PATENT DOCUMENTS

| | | | |
|---|---|---|---|
| CN | 1753204 | 3/2006 | |
| EP | 0969538 | 1/2000 | |
| EP | 1641057 A2 * | 3/2006 | ............. H01M 2/02 |
| JP | 10-184939 | 6/1998 | |
| JP | 2000-021435 | 1/2000 | |

(Continued)

OTHER PUBLICATIONS

Office Action dated May 25, 2011 from corresponding Application No. CN 200910146318.X.

(Continued)

*Primary Examiner* — Karie O'Neill Apicella
(74) *Attorney, Agent, or Firm* — Knobbe, Martens, Olson & Bear, LLP

(57) ABSTRACT

An electrode assembly and a lithium secondary battery comprising the same are disclosed.

Specifically, the present invention provides an electrode assembly which is capable of preventing the occurrence of a short circuit between a non-coating portion of an electrode plate and an active material layer of an electrode plate having an opposite polarity when damage or shrinkage of a separator takes place, through the attachment of an insulating tape to either or both sides of the non-coating portion of an electrode plate without attachment of an electrode tab.

Therefore, an internal short circuit of the battery can be prevented by application of the electrode assembly of the present invention to a variety of lithium secondary batteries including pouch-type, polygonal and cylindrical batteries.

16 Claims, 11 Drawing Sheets

(56) References Cited

FOREIGN PATENT DOCUMENTS

| JP | 2000-188115 | | 7/2000 |
|---|---|---|---|
| JP | 2001-93583 | | 4/2001 |
| JP | 3613400 | | 11/2004 |
| JP | 3613400 | * | 1/2005 |
| JP | 2005-222884 | | 8/2005 |
| JP | 2005-285691 | | 10/2005 |
| JP | 2005-347161 | | 12/2005 |
| JP | 2006-024452 | | 1/2006 |
| JP | 2006-120604 | | 5/2006 |
| JP | 2007-194130 | | 8/2007 |
| KR | 10 2005-0096290 | | 10/2005 |
| KR | 1020050096290 | | 10/2005 |
| KR | 10-2006-0124036 | | 12/2006 |
| KR | 10 2007-0087857 | | 8/2007 |
| KR | 1020070087857 | | 8/2007 |

OTHER PUBLICATIONS

Office Action dated Dec. 30, 2011 for corresponding KR Application No. 10-2009-0046638.

Office Action dated Jul. 10, 2012 for corresponding JP Application No. 2009-145627.

Notice of Allowance dated Aug. 31, 2012 for corresponding KR Application No. 10-2009-0046638.

* cited by examiner

ELECTRODE ASSEMBLY AND LITHIUM SECONDARY BATTERY WITH SAME

RELATED APPLICATIONS

This application claims the benefit of U.S. Provisional Application Ser. No. 61/074,566, entitled Electrode Assembly and Lithium Secondary Battery With the Same, filed Jun. 20, 2008 and hereby incorporated by reference in its entirety.

BACKGROUND OF THE INVENTION

1. Field of the Invention

The present invention relates to a secondary battery. More specifically, the present invention relates to an electrode assembly and a lithium secondary battery comprising the same.

2. Description of the Related Art

Generally, the lithium secondary battery employs lithium-based oxide as a positive electrode active material and a carbon material as a negative electrode active material. Further, the lithium secondary batteries may be broadly classified into a liquid electrolyte battery and a polymer electrolyte battery, depending on the type of electrolytes used in them. The lithium battery using a liquid electrolyte is known as a lithium ion battery, and the lithium battery using a polymer electrolyte is known as a lithium polymer battery. In addition, the lithium secondary battery may be formed in various shapes, and the typical shape is a cylindrical shape, a polygonal shape or a pouch shape.

An electrode assembly is seated inside a case of such a lithium secondary battery. The electrode assembly is formed by stacking or winding a positive electrode plate, a negative electrode plate and a separator disposed therebetween. An electrode plate including the positive electrode plate and the negative electrode plate is composed of a current collector and an active material layer applied to at least one surface of the current collector. Both ends of the current collector are often provided with non-coating portions which are not coated with the active material layer. An electrode tab is provided on either one of the non-coating portions.

An insulating tape is attached to the boundary between the active material layer and the non-coating portion with formation of the electrode tab. The insulating tape protects an electrical connection part between the electrode plate and the electrode tab and prevents the occurrence of a short circuit due to direct contact between different electrode plates of opposite polarities.

Unfortunately, even though an insulating tape is provided on an electrode tab-fixed region in the non-coating portions formed on both ends of the electrode plate, an internal short circuit may occur due to non-coating portion/non coating portion contact or non-coating portion/active material layer contact between electrode plates of opposite polarities, when damage or shrinkage of a separator occurs due to internal or external impact or heat generation.

Further, the non-coating portion without provision of the electrode tab is more highly susceptible to the occurrence of an internal short circuit, due to probable contact with the non-coating portion or active material layer of the electrode plate having an opposite polarity. Particularly when the non-coating portion of the electrode plate is in contact with the active material layer of the electrode plate having an opposite polarity, it may cause fatal damage to thereby result in the danger of ignition or explosion of the battery.

SUMMARY OF THE INVENTION

Therefore, the present invention has been made in view of the above problems, and it is an object of the present invention to prevent the occurrence of an internal short circuit via the prevention of exposure of a non coating portion by insulating the non-coating portion of an electrode plate to which an electrode tab was not attached.

It is another object of the present invention to prevent the risk of an internal short circuit which may occur upon contact of a non-coating portion with an active material layer of a negative electrode plate, through the insulation of the non-coating portion with no formation of an electrode tab particularly in a positive electrode plate.

In accordance with an aspect of the present invention, the above and other objects can be accomplished by the provision of an electrode assembly which is capable of preventing the occurrence of a short circuit between a non-coating portion of an electrode plate and an active material layer of an electrode plate having an opposite polarity when damage or shrinkage of a separator takes place, through the attachment of an insulating member to at least one side of the non-coating portion of an electrode plate without attachment of an electrode tab.

In accordance with another aspect of the present invention, there is provided an electrode assembly which is capable of achieving good heat dissipation efficiency by installation of an electrode tab in a non-coating portion of an electrode plate positioned on the outer periphery of an electrode assembly, and insulation of a non-coating portion of an electrode plate from an active material layer of an opposite polarity by installation of an insulating member in a non-coating portion of an electrode plate without formation of an electrode tab positioned on the inner periphery of an electrode assembly.

More specifically, a positive electrode tab of a positive electrode plate is installed in a rear positive electrode non-coating portion positioned on the outer periphery of the electrode assembly and a negative electrode tab of a negative electrode plate is installed in a rear negative electrode non-coating portion positioned on the outer periphery of the electrode assembly. Insulation between an electrode non-coating portion and an active material layer is achieved by attaching an insulating member to a front positive electrode non-coating portion of the positive electrode plate or a negative electrode active material layer of the corresponding negative electrode plate.

Preferably, desired insulating effects are obtained by attaching an insulating member to both sides of the front positive electrode non-coating portion of the positive electrode plate.

Where the insulating member is attached to the front positive electrode non-coating portion of the positive electrode plate or the negative electrode active material layer of the negative electrode plate oppositely corresponding to the front positive electrode non-coating portion, the insulating member is not necessarily attached to a front negative electrode non-coating portion of the negative electrode plate.

As a consequence, the front non-coating portion of the positive electrode plate with no attachment of the electrode tab, positioned on the inner periphery of the electrode assembly, will be insulated from the negative electrode active material layer of the negative electrode plate, even when damage or shrinkage of a separator takes place. Therefore, safety of the battery is improved by preventing the occurrence of a short circuit due to internal heat generation of a lithium secondary battery which is sought for the realization of higher capacity.

In one aspect the present invention comprises a battery assembly comprising a casing and an electrode assembly positioned within the casing, wherein the electrode assembly includes a first electrode, a second electrode and a separator interposed therebetween wherein the first electrode includes a first coated portion that is coated with a first electrode active material and at least one fit uncoated portion and wherein the second electrode includes a second coated portion that is coated with a second electrode active material and at least one second uncoated portion wherein the first and second uncoated portions have a length. In this aspect the invention further comprises a first electrode tab that is coupled to the at least one first uncoated portion of the first electrode and a second electrode tab that is coupled to the at least one second uncoated portion of the second electrode; and at least one lamination layer positioned on at least a part of the uncoated portions of the first and second electrodes so that at least one of the first and second uncoated portions are covered by the at least one lamination layer along their length.

In another aspect, the invention comprises an electrode assembly for a battery assembly, the electrode assembly comprising a first electrode having a first coated portion coated with a first electrode active material and a front and rear uncoated portions, a second electrode having a second coated portion coated with a second electrode active material and a front and rear uncoated portions and a separator interposed between the first and second electrodes. In this aspect; the invention further comprises a first electrode tab that is coupled to the rear uncoated portion of the first electrode a second electrode tab that is coupled to the rear uncoated portion of the second electrode and at least one lamination layer positioned on the front uncoated portions of at least one of the first and second electrodes so as to cover all of the at least one of the first and second electrodes.

In yet another aspect the invention comprises a method of forming an electrode assembly for a battery, the method comprising coating a portion of a first electrode with a first electrode coating material so as to define a coated portion and at least one non-coated portion having a length, coating a portion of the second electrode with a second electrode coating material so as to define a coated portion and at least one non-coated portion having a length and positioning at least one layer of lamination between the at least one non-coated portions of the first and second electrodes so that the at least one layer of lamination covers along the length of at least one of the non-coated portions of the first and second electrodes.

DETAILED DESCRIPTION OF THE PREFERRED EMBODIMENTS

Figure 1:
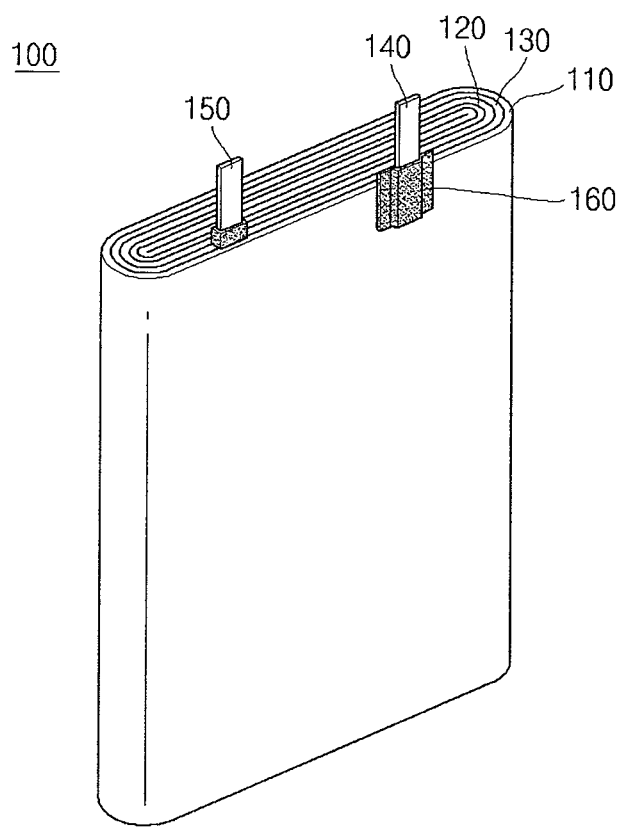
FIG. 1 is a perspective view of an electrode assembly in accordance with one embodiment of the present invention.
Figure 2A:
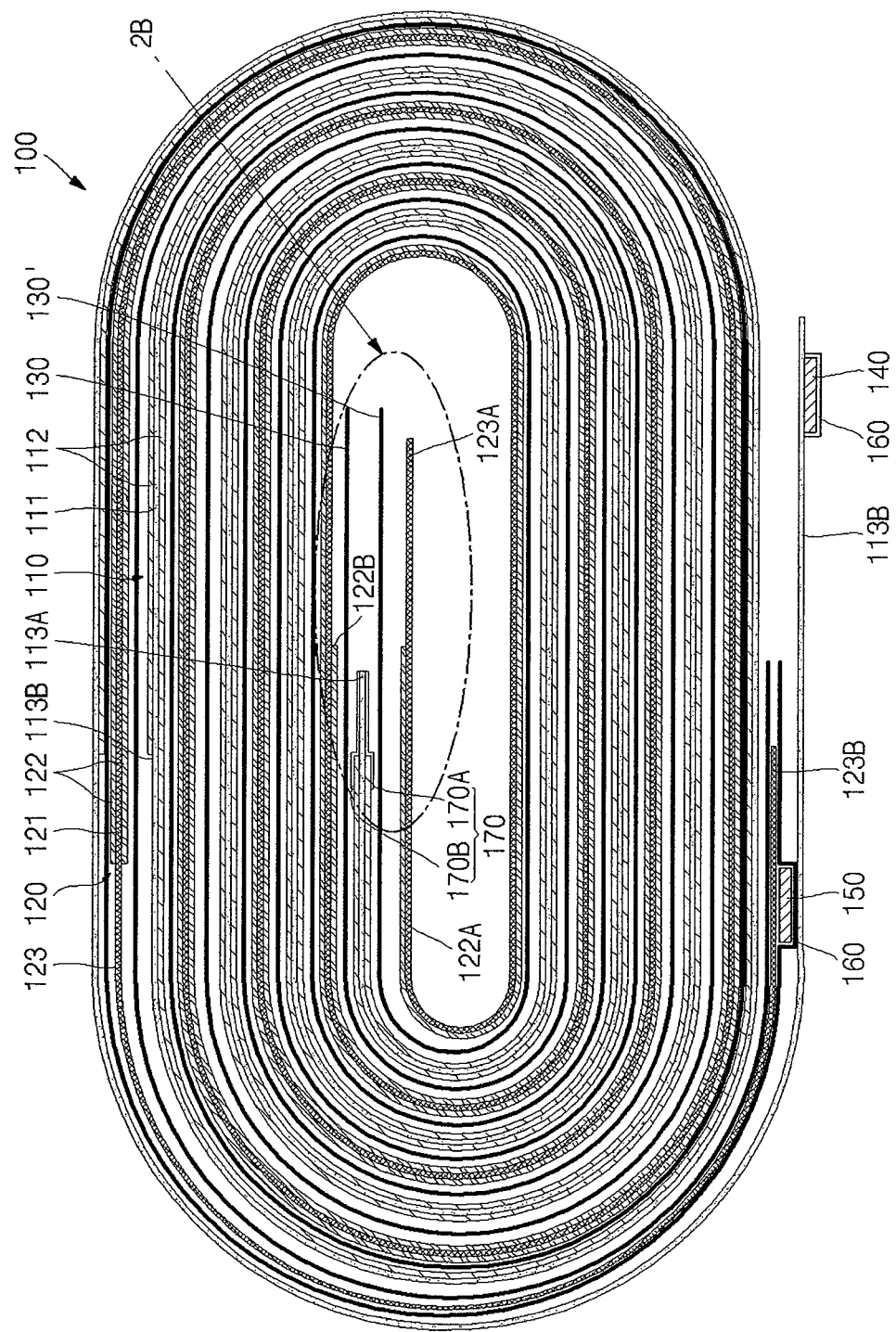
FIG. 2A is a cross-sectional view of FIG. 1.
Figure 2B:
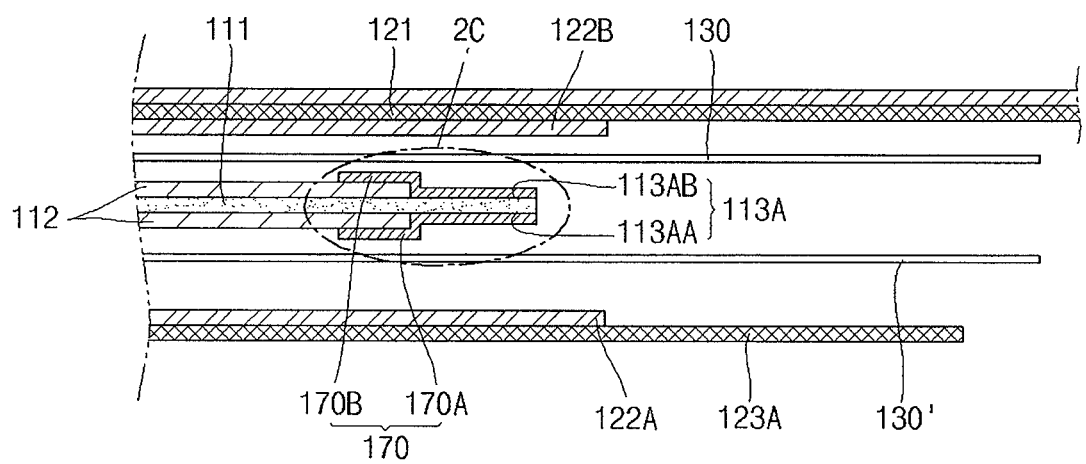
FIG. 2B is an enlarged view of Part 2B in FIG. 2A.
Figure 2C:
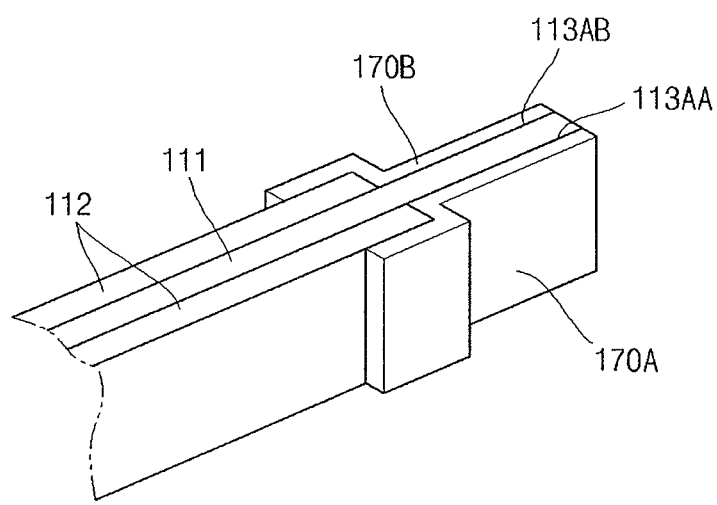
FIG. 2C is a perspective view of Part 2C in FIG. 2B.

Now, preferred embodiments of the present invention will be described in more detail with reference to the accompanying drawings.

Referring to FIG. 1 and FIGS. 2A to 2C, an electrode assembly 100 in accordance with an embodiment of the present invention includes a positive electrode plate 110, a negative electrode plate 120 and a separator 130. The electrode assembly 100 is prepared by stacking the positive electrode plate 110, the negative electrode plate 120 and the separator 130 disposed therebetween and winding the resulting stacked structure into a jelly roll shape.

In fabrication of the electrode assembly 100, both ends of each of the positive electrode plate 110 and negative electrode plate 120 are provided with non-coating portions 113, 123 when the positive electrode plate 110, the separator 130 and the negative electrode plate 120 are wound into a jelly-roll configuration. Among the non-coating portions 113, 123, the non-coating portion where the winding starts is designated front non-coating portions 113A, 123A, whereas the non-coating portion where the winding ends is designated rear non-coating portions 113B, 123B.

For brevity and convenience of explanation, an inner periphery of the electrode assembly is defined as the portion where front ends of the wound positive electrode plate 110 and negative electrode plate 120 are positioned, whereas an outer periphery of the electrode assembly is defined as the portion where rear ends of the positive and negative electrode plates are positioned. In addition, out of both sides of the non-coating portion, one side facing toward the inner periphery of the electrode assembly is designated a front surface, whereas the other side facing toward the outer periphery of the electrode assembly is designated a rear surface.

In connection with the positive electrode non-coating portion 113, the front positive electrode non-coating portion 113A will be described with reference to two separate non-coating portions, i.e. a first front positive electrode non-coating portion 113AA corresponding to the front surface and a second front positive electrode non-coating portion 113AB corresponding to the rear surface.

In the positive electrode plate 110, a positive electrode tab 140 is welded to a rear positive electrode non-coating portion 113B. In the rear positive electrode non-coating portion 113B, a protective tape 160 is attached to the portion to which the positive electrode tab 140 was welded. The protective tape 160 is attached to enclose the portion where the positive electrode tab 140 protrudes relative to the positive electrode current collector 111.

A lamination tape 170, such as a polyethylene or polypropylene, is attached to the front positive non-coating portion 113A of the positive electrode plate 110. The front positive non-coating portion has a length and the lamination tape is positioned to coat the uncoated portion along its length so as to substantially cover the non-coated portion. When the lamination tape 170 is attached to the front positive electrode non-coating portion 113A of the positive electrode plate 110, external exposure of the front positive electrode non-coating portion 113A is avoided by such a lamination tape 170.

More specifically, a first lamination tape 170A is attached to a first front positive electrode non-coating portion 113AA of the front positive electrode non-coating portion 113A, whereas a second lamination tape 170B is attached to a second front positive electrode non-coating portion 113AB of the front positive electrode non-coating portion 113A in the same manner as discussed above.

Therefore, the occurrence of a short circuit is inhibited because the first front positive electrode non-coating portion 113AA of the front positive electrode non-coating portion 113A of the positive electrode plate 110 and the negative electrode active material layer 122A of the corresponding negative electrode plate 120 are insulated from each other by the first lamination tape 170A even when damage or shrinkage of the separators 130, 130' occurs due to internal heat generation of the battery. Further, since a second front positive electrode non-coating portion 113AB of the front positive electrode non-coating portion 113A of the positive electrode plate 110 is insulated from the negative electrode active material layer 122B of the corresponding negative electrode plate 120 by a second lamination tape 170B, the likelihood of occurrence of a short circuit is reduced.

The positive electrode plate 110 includes a positive electrode current collector 111 made of thin aluminum foil and a positive electrode active material layer 112 containing, as a main ingredient lithium-based oxide coated on both sides of the positive electrode current collector 111. On the positive electrode current collector 111, a positive electrode non-coating portion 113, corresponding to the region which was not coated with the positive electrode active material layer 112, is provided on both ends of the positive electrode plate 110, thereby forming the front non-coating portion 113A and the rear non-coating portion 113B as described above.

Further, a positive electrode tab 140 is fixed to the non-coating portion of either one of the positive electrode non-coating portions 113 by ultrasonic welding. In one embodiment of the present invention, the positive electrode tab 140 is welded to the rear positive electrode non-coating portion 113B of the positive electrode plate 110. The positive electrode tab 140 is welded to protrude above an upper end of the positive electrode current collector 111. The positive electrode tab 140 is conventionally formed of nickel or nickel alloy. Other metal materials may also be used for the positive electrode tab 140.

A negative electrode tab 150 is welded to a rear negative electrode non-coating portion 123B of the negative electrode plate 120. A protective tape 160 is attached to the region of the rear negative electrode non-coating portion 123B to which the negative electrode tab 150 was welded. The protective tape 160 is attached to enclose the portion where the negative electrode tab 150 protrudes relative to the negative electrode current collector 121.

The negative electrode plate 120 includes a negative electrode current collector 121 made of thin copper foil and a negative electrode active material layer 122 containing, as a main ingredient, a carbon material coated on both sides of the negative electrode current collector 121. For the negative electrode current collector 121, a negative electrode non-coating portion 123, corresponding to the region which was not coated with the negative electrode active material layer 122, is also provided on both ends of the negative electrode plate. As described above, the negative electrode non-coating portion 123 is composed of a front negative electrode non-coating portion 123A and a rear negative electrode non-coating portion 123B.

A negative electrode tab 150 is fixed to the rear negative electrode non-coating portion 123B of the negative electrode non-coating portion 123 by ultrasonic welding. Herein, the negative electrode tab 150 is welded to protrude above an upper part of the negative electrode current collector 121. The negative electrode tab 150 is conventionally formed of nickel or nickel alloy. Other metals may also be used as a material for the negative electrode tab 150.

The separator 130 is disposed between electrode plates 110, 120 so as to electrically isolate the positive electrode plate 110 from the negative electrode plate 120. The separator 130 is formed of polyethylene, polypropylene, or a polyethylene/polypropylene composite film. The separator 130 is formed to have a width larger than that of the positive electrode plate 110 and the negative electrode plate 120, and protrudes upward and downward from the positive electrode plate 110 and the negative electrode plate 120.

As discussed hereinbefore, in the electrode assembly 100 in accordance with one embodiment of the present invention, the positive elide tab 140 and the negative electrode tab 150 are attached to the outer periphery of the electrode assembly, and the protective tape 160 is attached to the positive electrode tab 140 and the negative electrode tab 150. Out of the front positive electrode non-coating portions 113A of the positive electrode plate 110 in the inner periphery of the electrode assembly, the first lamination tape 170A is attached to the first front positive electrode non-coating portion 113AA, whereas the second lamination tape 170B is attached to the second front positive electrode non-coating portion 113AB.

Hereinafter, attachment of the lamination tape 170 (170A, 170B) to the front positive electrode non-coating portion 113A of the positive electrode plate 110 will be described in more detail.

The first and second lamination tapes 170A, 170B are prepared to have the same length as the first and second front positive electrode non-coating portions 113AA, 113AB of the positive electrode plate 110 and preferably are precisely attached to the first front positive electrode non-coating portion 113AA and the second front positive electrode non-coating portion 113AB, respectively. In this way, the tapes 170A, 170B cover all of the non-coating portions 113AA, 113AB.

However, a length of the first and second lamination tapes 170A, 170B may be not identical with a length of the first and second front positive electrode non-coating portions 113AA, 113AB of the positive electrode plate 110, or one of the first and second lamination tapes 170A, 170B may have a length shorter or longer than that of the other one.

Unfortunately, the tapes may be attached to incorrect sites during attachment of the first and second lamination tapes 170A, 170B to the first and second front positive electrode non-coating portions 113AA, 113AB.

When such an error occurs during a manufacturing process, the first front positive electrode non coating portion 113AA or second front positive electrode non-coating portion 113AB of the positive electrode plate 110 may partially exhibit the region which is not insulated by the lamination tape.

According to the present invention, when such a manufacturing process problem occurs, the non-insulated portion due to no attachment of the lamination tape (usually occurring in end parts of the non-coating portion), i.e. the end of the front positive electrode non-coating portion 113A of the positive electrode plate 110 is cut by a certain length. That is, the end of the front positive electrode non-coating portion 113A is cut to remove the portion to which the lamination tape was not attached, under the condition where the first and second lamination tapes 170A, 170B are attached to the front and rear surfaces of the positive electrode non-coating portion 113A.

More specifically, the end of the front positive electrode non-coating portion 113A may be cut using two different methods.

Figure 3:
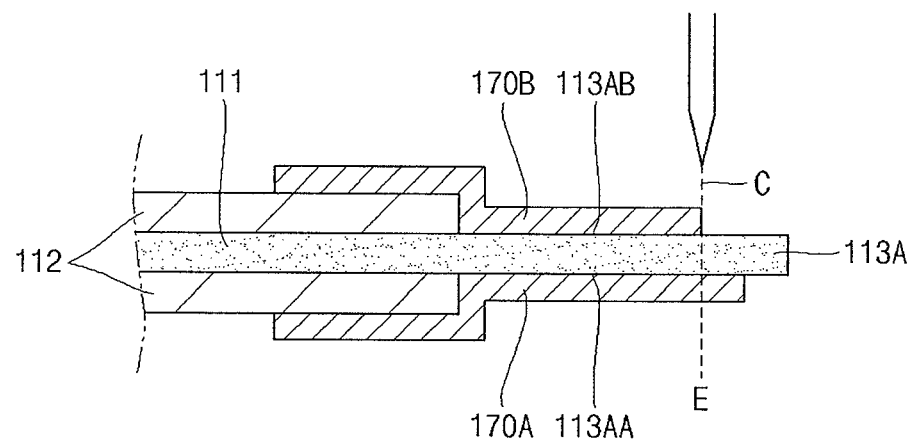
FIG. 3 is a cutting process view of a front positive electrode non-coating portion of an electrode assembly in accordance with one embodiment of the present invention.

Reference is made to FIG. 3 which shows one of two cutting methods. According to the method of FIG. 3, under the condition where a length of the second lamination tape 170B attached to the second front positive electrode non-coating portion 113AB is shorter than the first lamination tape 170A attached to the first front positive electrode non-coating portion 113AA, the cutting is made based on the lamination tape having a shorter length. That is, the cutting is performed along the end (E) of the second lamination tape 170B as a cutting line (C). As described above, when the end (E) of the second lamination tape 170B having a relatively short length is cut, the first front positive electrode non-coating portion 113AA is insulated from the outside by the first lamination tape 170A. Further, the second front positive electrode non-coating portion 113AB is also insulated by the second lamination tape 170B.

Therefore, front and rear surfaces of the front positive electrode non-coating portion 113A of the positive electrode plate 100 are completely insulated by the lamination tapes 170 (170A,170B) as the lamination tape covers the length of the uncoated portions.

Figure 4:
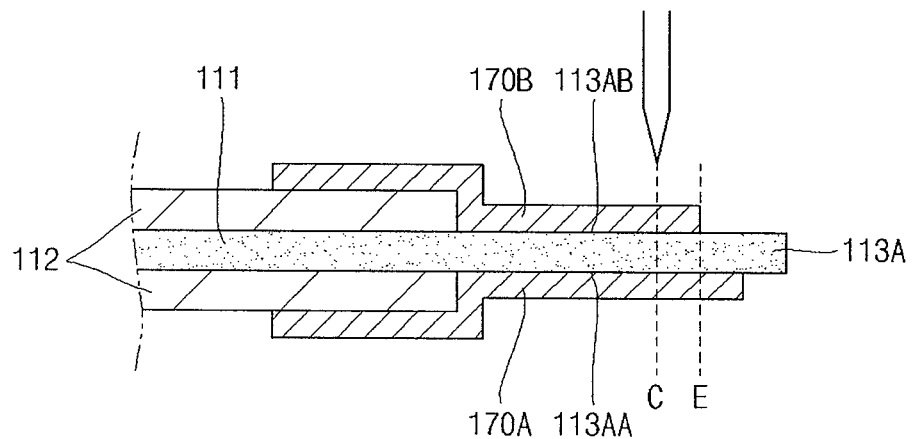
FIG. 4 is a cutting process view of a front positive electrode non-coating portion of an electrode assembly using a different method than that of FIG. 3.

Referring to FIG. 4 illustrating another method of cutting, the same condition applies where a length of the second lamination tape 170B attached to the second front positive electrode non-coating portion 113AB is shorter than the first lamination tape 170A attached to the first front positive electrode non-coating portion 113AA. The cutting is made along a cutting line (C) defined inside the end (E) of the second lamination tape 170B having a shorter length. As described above, when the cutting is carried out by defining the cutting line (C) inside the end (E) of the second lamination tape 170B, the first front positive electrode non-coating portion 113AA is insulated from the outside by the first lamination tape 170A. Further, the second front positive electrode non-coating portion 113AB is also insulated by the second lamination tape 170B.

In this manner, when the inside of the second lamination tape 170B having a shorter length is cut, it is possible to solve the problem of inferior goods due to cutting errors which may occur during the cutting process of the end (E) of the second lamination tape 170B.

The aforesaid cutting methods are illustrated for the case where a length of the second lamination tape 170B is shorter. On the other hand, where a length of the first lamination tape 170A is shorter, a cutting process is done along the end of the first lamination tape 170A as a cutting line.

Hereinafter, a detailed description will be given to illustrate the prevention of an internal short circuit by an electrode assembly in accordance with one embodiment of the present invention.

The positive electrode tab 140 and the negative electrode tab 150 are provided on the outer periphery of the electrode assembly 100 in accordance with one embodiment of the present invention.

For the inner periphery of the electrode assembly 100, the lamination tape 170 is attached to the front positive electrode non-coating portion 113A of the positive electrode plate 110. The lamination tape 170 is composed of first and second lamination tapes 170A, 170B. The first and second lamination tapes 170A, 170B are respectively attached to the first and second front positive electrode non-coating portions 113AA, 113AB, which correspond to both sides of the front positive electrode non-coating portion 113A of the positive electrode plate 110. When any one front non-coating portion of the first front positive electrode non-coating portion 113AA and the second front positive electrode non-coating portion 113AB is not completely insulated by the first and second lamination tapes 170A, 170B, the end of the front positive electrode non-coating portion 113A of the positive electrode plate 100 will be cut as necessary. Therefore, first and second front positive electrode non-coating portions 113AA, 113AB are preferably completely insulated from the outside by the first and second lamination tapes 170A, 170B.

In this manner, the front and rear surfaces of front positive electrode non-coating portion 113A of the positive electrode plate 110 are insulated from the negative electrode active material layers 122A, 122B of the adjacent negative electrode plate 120, even when damage or shrinkage of the separators 130, 130' occurs due to internal heat generation in the inner periphery of the electrode assembly 100. As a result, it is possible to fundamentally prevent a short circuit which may occur on the inner periphery of the electrode assembly 100.

Hereinafter, an electrode assembly in accordance with another embodiment of the present invention will be described in more detail.

Figure 5A:
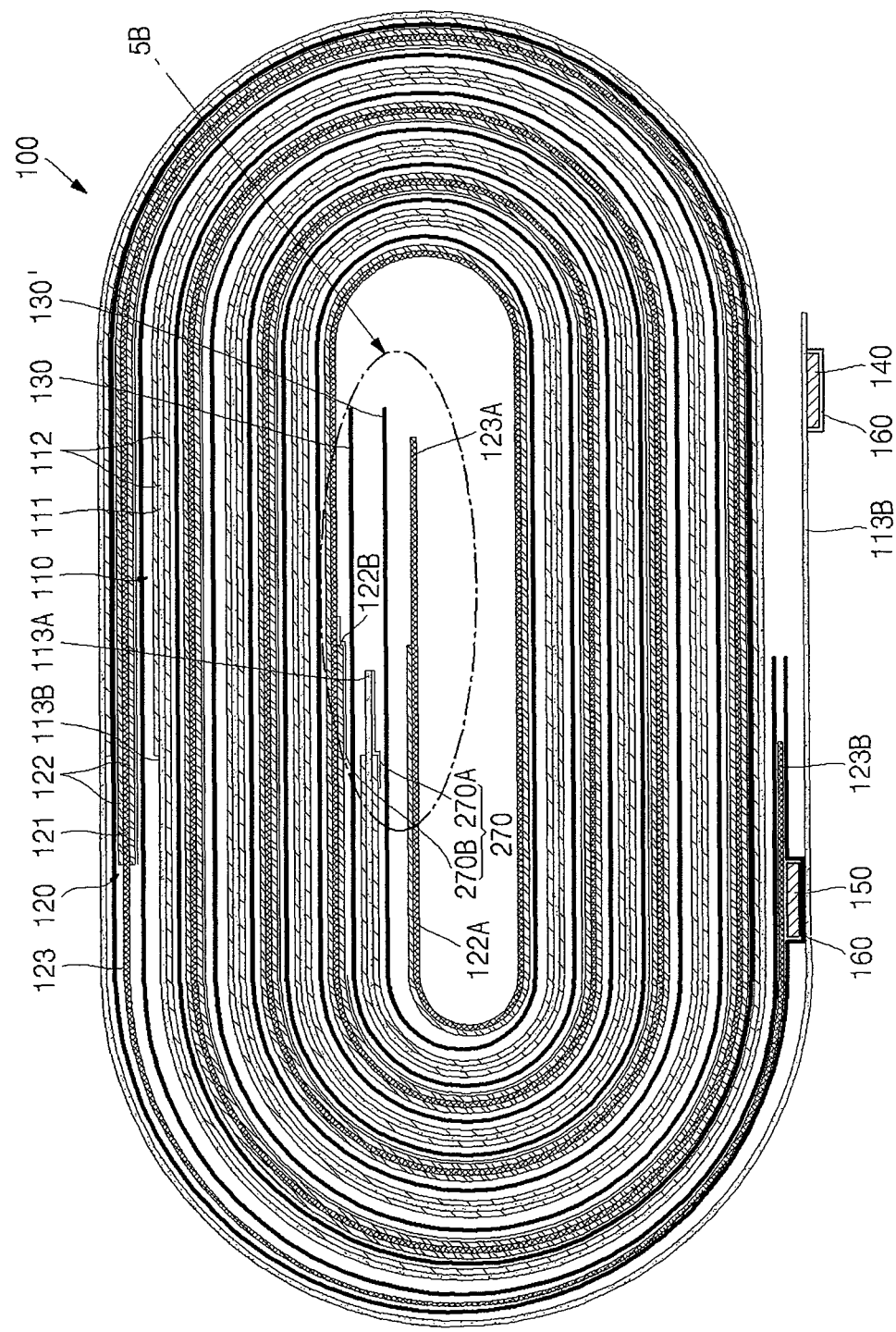
FIG. 5A is a cross-sectional view of an electrode assembly in accordance with another embodiment of the present invention.
Figure 5B:
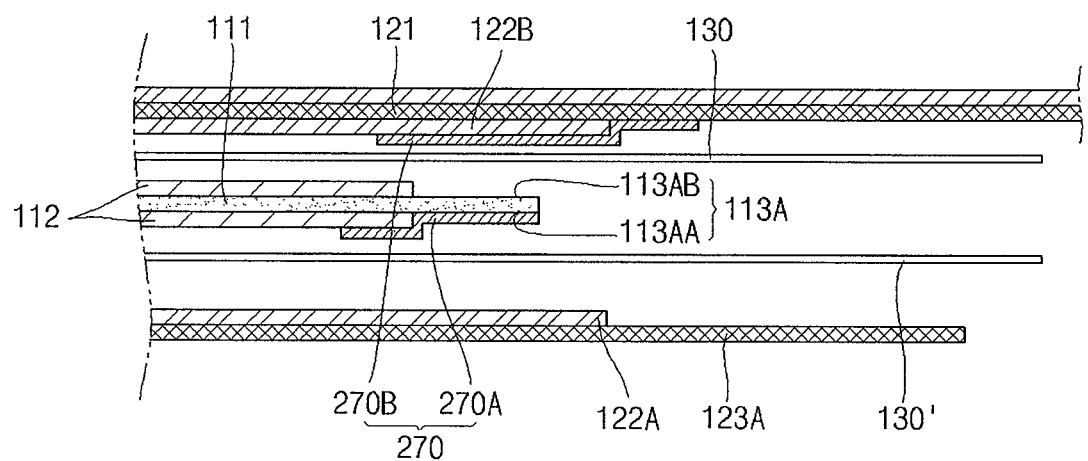
FIG. 5B is an enlarged view of Part 5B in FIG. 5A.

Referring to FIGS. 5A and 5B, an electrode assembly 200 in accordance with another embodiment of the present invention includes a positive electrode plate 110, a negative electrode plate 120 and a separator 130, and is prepared by stacking the positive electrode plate 110, the negative electrode plate 120 and the separator 130 disposed therebetween and winding the resulting stacked structure into a jelly roll shape.

Further, a battery construction comprising the positive electrode plate 110, the negative electrode plate 120 and the separator 130, a positive electrode tab 140, a negative electrode tab 150 and a protective tape 160 is also identical with one embodiment of the present invention. Like numbers refer to like elements in previously described figures, so details thereof will be omitted hereinafter.

In the electrode assembly 200 in accordance with another embodiment of the present invention, a first lamination tape 270A is attached only to a first front positive electrode non-coating portion 113AA in a front positive electrode non-coating portion 113A of the positive electrode plate. Further, a second lamination tape 270B is attached to the region oppositely corresponding to the second front positive electrode non-coating portion 113AB, in the negative electrode active material layer 122B of the negative electrode current collector 121 of the negative electrode plate 120 which is faced opposite to the positive electrode plate 110 with the separator 130 therebetween.

Hereinafter, a detailed description will be given to illustrate the prevention of an internal short circuit by application of the electrode assembly 200 constructed as above.

The positive electrode tab 140 and the negative electrode tab 150 are provided on the outer periphery of the electrode assembly 200.

For the inner periphery of the electrode assembly 200, the first lamination tape 270A is attached to a first front positive electrode non-coating portion 113AA of the positive electrode plate 110. The first lamination tape 270A is attached to the first front positive electrode non-coating portion 113AA of the front positive electrode non-coating portion 113A of the positive electrode plate 110 and completely covers the first front positive electrode non-coating portion 113AA, such that the first front positive electrode non-coating portion 113AA and an active material layer 122A of the negative electrode plate 120, which are arranged opposite to each other, are insulated.

Further, the second lamination tape 270B is attached to a region of the negative electrode active material layer 122B of the negative electrode current collector 121 to which a second front positive electrode non-coating portion 113AB is oppositely faced.

Accordingly, the first front positive electrode non-coating portion 113AA of the front positive electrode non-coating portion 113A of the positive electrode plate 110 is insulated from the negative electrode active material layer 122A by the first lamination tape 270A, even when damage or shrinkage of the separators 130,130' occurs. Further, a second front positive electrode non-coating portion 113AB of the front positive electrode non-coating portion 113A of the positive electrode plate 110 is insulated from the corresponding opposite negative electrode active material layer 122B by the second lamination tape 270B.

As a consequence, it is possible to fundamentally prevent a short circuit which occurs on the inner periphery of the electrode assembly 200.

Hereinafter, an electrode assembly in accordance with a further embodiment of the present invention will be described in more detail.

Figure 6A:
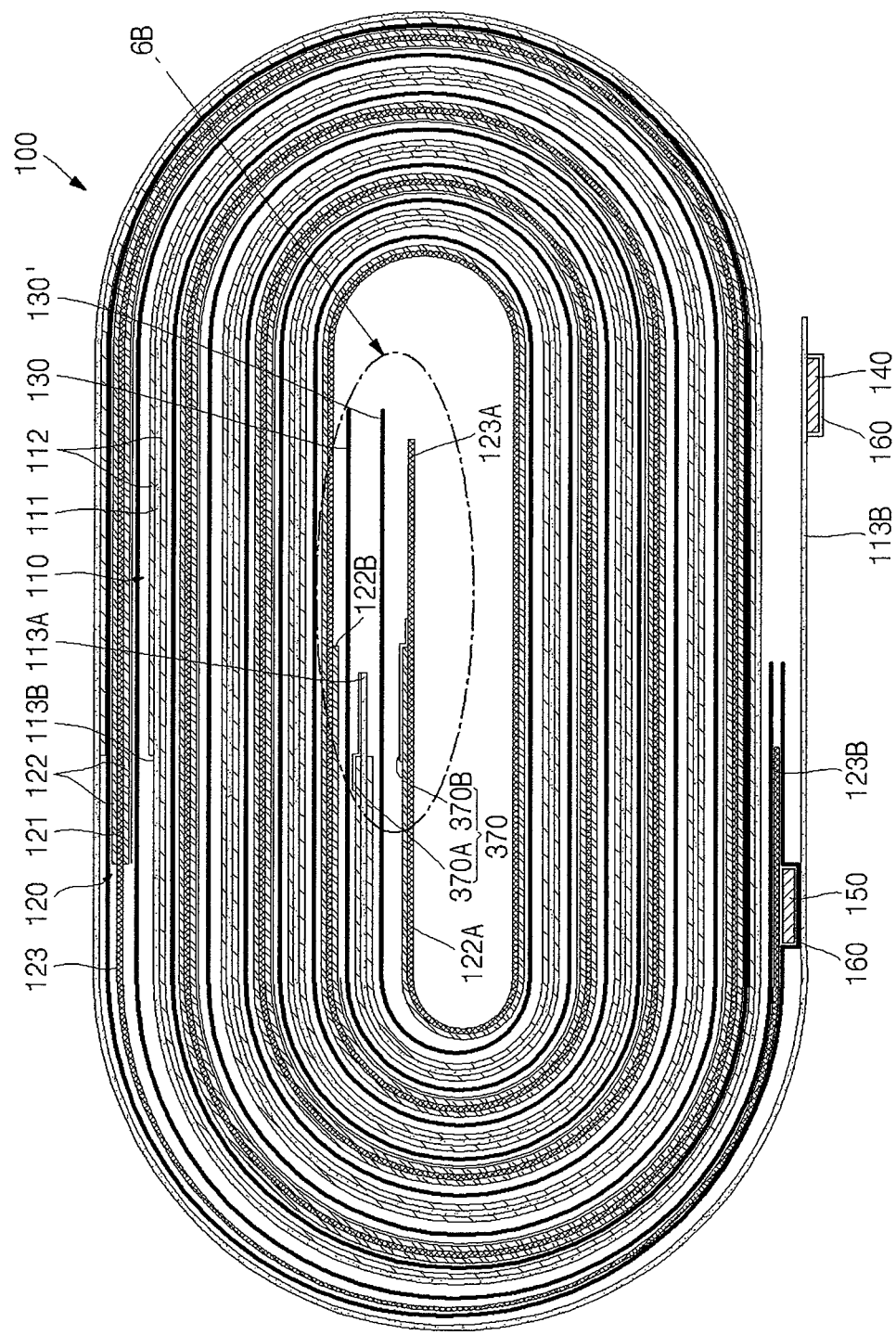
FIG. 6A is a cross-sectional view of an electrode assembly in accordance with a further embodiment of the present invention.
Figure 6B:
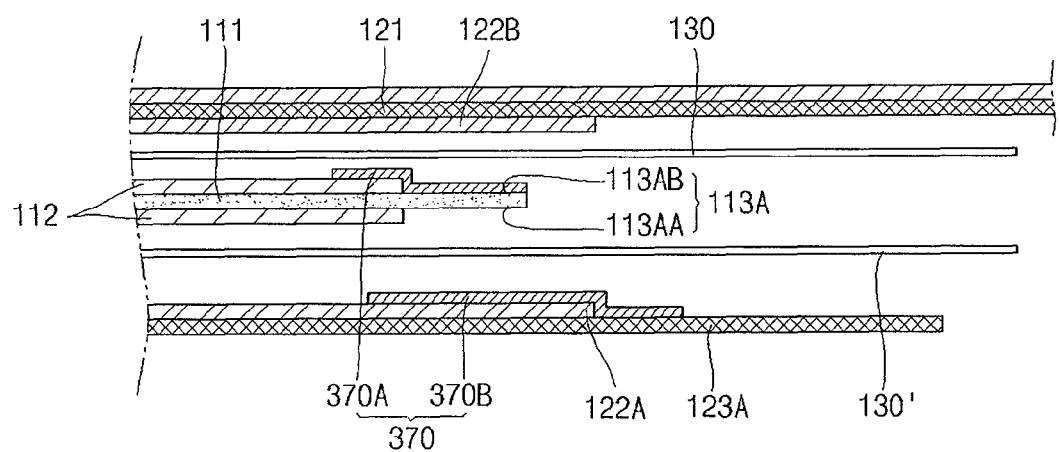
FIG. 6B is an enlarged view of Part 6B in FIG. 6A.

Referring to FIGS. 6A and 6B, an electrode assembly 300 in accordance with a further embodiment of the present invention includes a positive electrode plate 110, a negative electrode plate 120 and a separator 130, and is prepared by stacking the positive electrode plate 110, the negative electrode plate 120 and the separator 130 disposed therebetween and winding the resulting stacked structure into a jelly roll shape.

Further, a battery construction comprising the positive electrode plate 110, the negative electrode plate 120 and the separator 130, a positive electrode tab 140, a negative electrode tab 150 and a protective tape 160 is also identical with one embodiment of the present invention. Like numbers refer to like elements in previously described figures, so details thereof will be omitted hereinafter.

In the electrode assembly 300 in accordance with a further embodiment of the present invention, a first lamination tape 370A is attached only to a second front positive electrode non-coating portion 113AB of a front positive electrode non-coating portion 113A of the positive electrode plate. Further, a second lamination tape 370B is attached to the region oppositely corresponding to the first front positive electrode non-coating portion 113AA of the positive electrode plate, in the negative electrode active material layer 122A which is faced opposite to the front positive electrode non-coating portion 113A with the separator 130' therebetween.

Hereinafter, a detailed description will be given to illustrate the prevention of an internal short circuit by application of the electrode assembly 300 constructed as above.

The positive electrode tab 140 and the negative electrode tab 150 are provided on an outer periphery of the electrode assembly 300.

On the inner periphery of the electrode assembly 300, the first lamination tape 370A is attached to a second front positive electrode non-coating portion 113AB of the positive electrode plate 110. The first lamination tape 370A completely covers the second front positive electrode non-coating portion 113AB, such that the second front positive electrode non-coating portion 113AB and an active material layer 122B of the negative electrode plate 120, which are arranged opposite to each other, are insulated.

Further, the second lamination tape 370B is attached to the negative electrode active material layer 122A formed on a front surface of the negative electrode plate 120 which is arranged opposite to the first front positive electrode non-coating portion 113AA.

Accordingly, the first front positive electrode nonpaying portion 113AA of the front positive electrode non-coating portion 113A of the positive electrode plate 110 is insulated from the negative electrode active material layer 122A by the second lamination tape 370B, even when damage or shrinkage of the separators 130,130' occurs. Further, a second front positive electrode non-coating portion 113AB of the front positive electrode non-coating portion 113A of the positive electrode plate 110 is insulated from the negative electrode active material layer 122B of the negative electrode plate 120 by the first lamination tape 370A.

As a consequence, it is possible to fundamentally prevent a short circuit which occurs on the inner periphery of the electrode assembly 300.

The electrode assemblies prepared according to the aforesaid embodiments of the present invention can be applied to the lithium secondary battery.

The lithium secondary batteries may be classified into different categories based on shapes of the battery case, for example polygonal, cylindrical and pouch shapes.

Figure 7A:
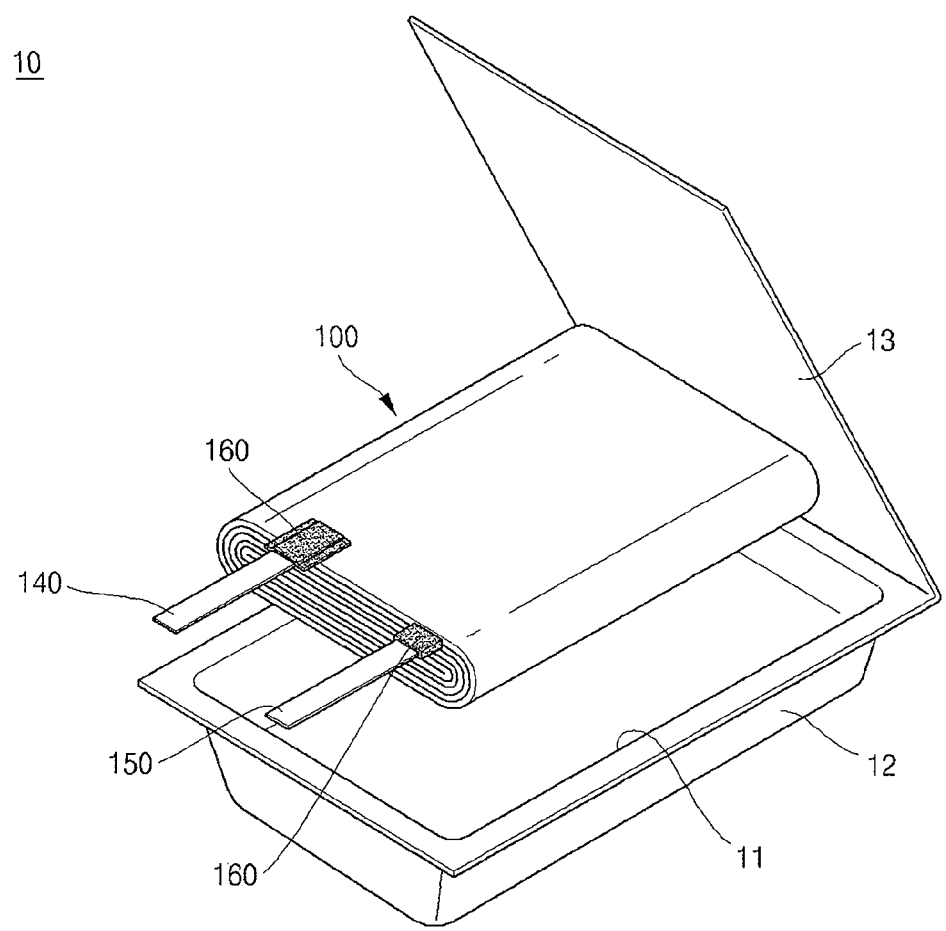
FIG. 7A is an exploded perspective view of a pouch-type lithium secondary battery using an electrode assembly in accordance with one embodiment of the present invention.
Figure 7B:
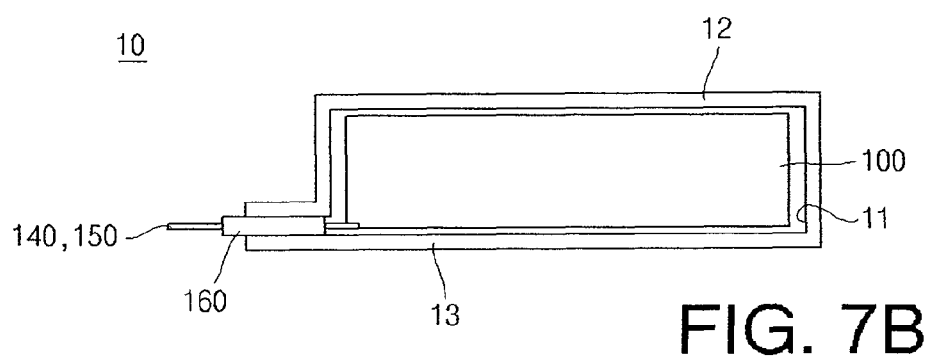
FIG. 7B is a sectional view showing an assembly state of FIG. 7A.

Referring to FIGS. 7A and 7B, a secondary battery 10 having a pouch-type case is shown.

The pouch-type lithium secondary battery 10 includes a first case 12 having an internal space 11 to house an electrode assembly 100 and a second case 13 for sealing the open upper part of the first case 12. The first and second cases 12,13 are formed of aluminum or aluminum alloy.

Therefore, the pouch-type secondary battery 10 is fabricated by installing the electrode assembly 100 in the internal space 11 of the first case 12 and hermetically sealing a sealing part between the first case 12 and the second case 13 to thereby prepare a unit cell of the pouch-type secondary battery.

The pouch-type secondary battery 10 using the electrode assembly 100 in accordance with one embodiment of the present invention exhibits no occurrence of a short circuit between an electrode non-coating portion and a negative electrode active material layer 122, since front and rear surfaces of the front positive electrode non-coating portion 113A are insulated by lamination tapes 170A,170B in the inner periphery of the electrode assembly 100 as described above. As a result, the risk of an internal short circuit in the fabricated battery is significantly decreased to thereby improve safety of the battery.

Figure 8:
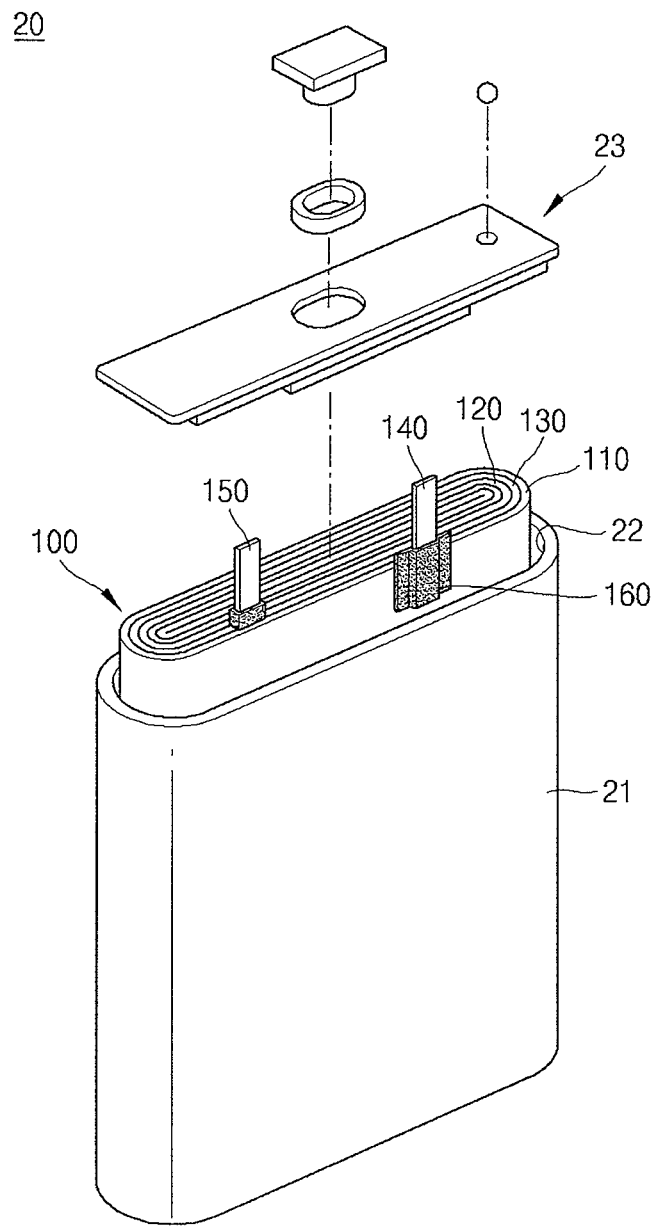
FIG. 8 is an exploded perspective view of a polygonal-type lithium secondary battery using an electrode assembly in accordance with one embodiment of the present invention.

Referring to FIG. 8, a secondary battery 20 having a polygonal-type case is shown.

The polygonal-type lithium secondary battery 20 includes an open-topped generally rectangular can 21 having an internal space 22 to house an electrode assembly 100 and a cap assembly 23 for delivering electric current of the electrode assembly 100 to the outside while sealing the open upper part of the can 21 after installation of the electrode assembly 100.

Therefore, the polygonal-type lithium secondary battery 20 is fabricated by installing the electrode assembly 100 in the internal space 22 of the can 21 and hermetically sealing the open upper part of the can 21 with the cap assembly 23 to thereby prepare a unit cell of the polygonal-type secondary battery.

In the polygonal-type lithium secondary battery 20 of the present invention, the cap assembly 23 includes a cap plate through which an electrode terminal of the electrode assembly passes, an insulating plate, a terminal plate, and the like.

Even though details of the cap assembly 23 are not described, it is to be understood that all of technical constructions known in the art fall within the scope of the present invention.

The polygonal-type lithium secondary battery 20 using the electrode assembly 100 in accordance with one embodiment of the present invention exhibits no occurrence of a short circuit between an electrode non-coating portion and a negative electrode active material layer 122, because front and rear surfaces of the front positive electrode non-coating portion 113A are insulated by lamination tapes 170A,170B in the inner periphery of the electrode assembly 100 as described above. As a result, the risk of an internal short circuit in the fabricated battery is significantly decreased to thereby improve safety of the battery.

Figure 9:
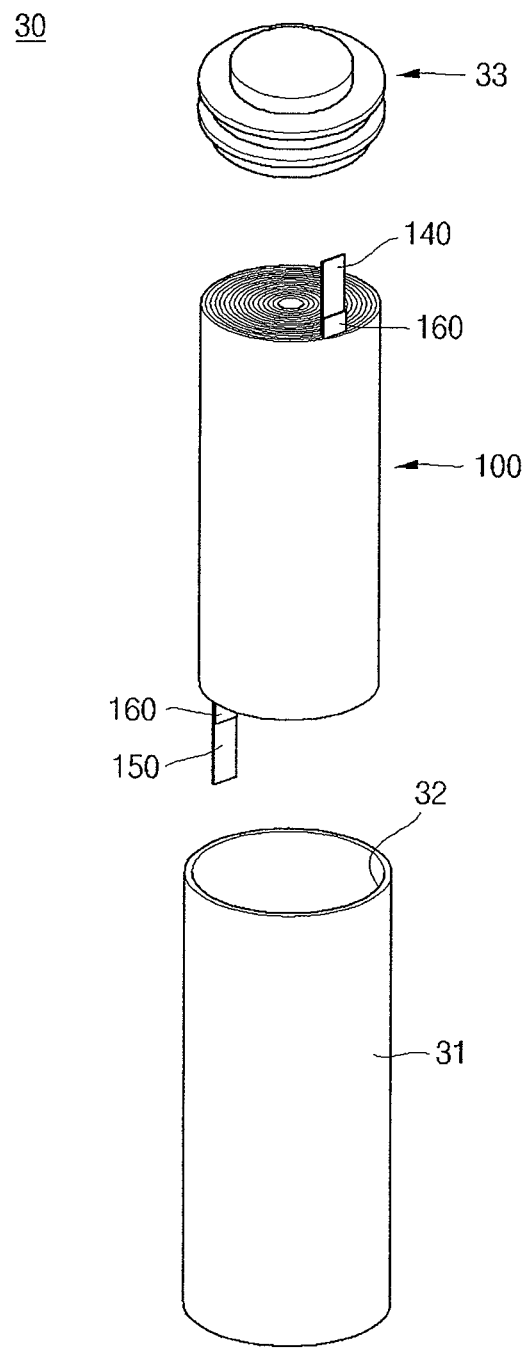
FIG. 9 is an exploded perspective view of a cylinder-type lithium secondary battery using an electrode assembly in accordance with one embodiment of the present invention.

Referring to FIG. 9, a secondary battery 30 having a cylindrical case is shown.

The cylindrical lithium secondary battery 30 includes an open-topped cylindrical can 31 having an internal space 32 to house an electrode assembly 100 and a cap assembly 33 for delivering electric current of the electrode assembly 100 to the outside while sealing the open upper part of the cylindrical can 31 after installation of the electrode assembly 100.

Therefore, the cylindrical lithium secondary battery 30 is fabricated by installing the electrode assembly 100 in the internal space 32 of the cylindrical can 31 and hermetically sealing the open upper part of the cylindrical can 31 with the cap assembly 33 to thereby prepare a unit cell of the cylindrical secondary battery.

In the cylindrical lithium secondary battery 30 of the present invention, the cap assembly 33 includes a cap up to which an electrode terminal of the electrode assembly is electrically connected, a safety vent, an insulator, a cap down, and the like. Even though details of the cap assembly 23 are not described herein, it is to be understood that all of technical constructions known in the art fall within the scope of the present invention.

The cylindrical lithium secondary battery 30 using the electrode assembly 100 in accordance with one embodiment of the present invention exhibits no occurrence of a short circuit between an electrode non-coating portion and a negative electrode active material layer 122, because front and rear surfaces of the front positive electrode non-coating portion 113A are insulated by lamination tapes 170A, 170B in the inner periphery of the electrode assembly 100 as described above. As a result, the risk of an internal short circuit in the fabricated battery is significantly decreased to thereby improve safety of the battery.

Meanwhile, in the cylindrical lithium secondary battery 30 of the present invention, when the positive electrode tab 140 of the electrode assembly 100 is allowed to protrude upward from the upper part of the electrode assembly 100, the negative electrode tab 150 is allowed to protrude downward from the bottom of the electrode assembly 100, thus resulting in electrical connection with the cylindrical can 31.

Even though the pouch-, polygonal- and cylinder-type lithium secondary batteries were exemplified with application of the electrode assembly 100 in accordance with one embodiment of the present invention, it should be understood that the same desired effects can be achieved with application of the electrode assembly (200,300) in accordance with other embodiments of the present invention.

What is claimed is:

1. A battery assembly comprising:
 a casing;
 an electrode assembly positioned within the casing, wherein the electrode assembly includes a first electrode, a second electrode and a separator interposed therebetween wherein the first electrode includes a first coated portion that is coated with a first electrode active material and at least one first uncoated portion having a first and a second side and wherein the second electrode includes a second coated portion that is coated with a second electrode active material and at least one second uncoated portion having a first and a second side wherein the first and second uncoated portions have a length;
 a first electrode tab that is coupled to the at least one first uncoated portion of the first electrode;
 a second electrode tab that is coupled to the at least one second uncoated portion of the second electrode; and
 a first lamination layer positioned on at least a part of the first side of the first uncoated portions of the first electrodes so that the first uncoated portions is covered by the first lamination layer entirely along the length of the first uncoated portion wherein the second side of the first uncoated portion is uncoated by a lamination layer and a second lamination layer is positioned on at least a part of the coated portion of the second electrode so that the second lamination layer is interposed between the coated portion of the second electrode and the uncoated portion of the first electrode.

2. The assembly of claim 1, wherein the case comprises a case selected from the group consisting essentially of a pouch-type case, a polygonal-type case, and a cylindrical-type case.

3. The assembly of claim 1, wherein the first electrode comprises a positive electrode which comprises a positive electrode plate that includes a positive electrode current collector and wherein the positive coated portion comprises a portion of the positive electrode current collector that is coated with an electrode active material.

4. The assembly of claim 3, wherein the positive electrode current collector comprises aluminum foil and the positive electrode active material comprises a lithium-based oxide coating.

5. The assembly of claim 1, wherein the second electrode comprises a negative electrode which comprises a negative electrode plate that includes a negative electrode current collector and wherein the negative coated portion comprises a portion of the negative electrode current collector that is coated with a negative electrode active material.

6. The assembly of claim 5, wherein the negative electrode current collector comprises copper foil and the negative electrode active material comprises a carbon material.

7. The assembly of claim 1, wherein the at least one uncoated portions of the first and second electrodes comprise a front and rear uncoated portions having first and second sides and wherein the first and second tabs are respectively attached to the rear uncoated portions of the first and second electrodes.

8. The assembly of claim 7, wherein the lamination layer is attached to at least one of the front uncoated portions of the first or second electrodes.

9. The assembly of claim 8, wherein a layer of lamination is interposed between adjacent sides of the front uncoated portions of the first and second electrode.

10. The assembly of claim 7, wherein the electrode assembly is wrapped such that the front uncoated portion of the first electrode is interposed between a first and a second portions of the second electrode and wherein both the first and second sides of the front uncoated portion of the first electrode are covered by the lamination layers.

11. The assembly of claim 7, wherein one side of the uncoated portions of the first and second electrodes that are adjacent each other are coated so that there is one layer of lamination between each adjacent side of the uncoated portions of the first and second electrodes.

12. The assembly of claim 1, wherein the at least one lamination layer is comprised of a layer of either polyethylene or polypropylene based lamination material.

13. The assembly of claim 7, wherein the both of the first and second sides of the front uncoated portion of the first electrode and the lamination layers are identical in length.

14. The assembly of claim 13, wherein the uncoated portions of the first electrode is the end of exposure in the lamination layers.

15. The assembly of claim 1, wherein the lamination layer is entirely positioned on at least one of the first and second sides of the uncoated portion of the first electrode and second electrodes.

16. The assembly of claim 1, wherein the lamination layer is positioned on at least a part of the uncoated portions of the first and second electrodes and at least a part of the coated portion of the first electrode and second electrodes.

* * * * *